United States Patent [19]

Lee

[11] 4,271,452
[45] Jun. 2, 1981

[54] AUTOMOTIVE AIR CONDITIONING APPARATUS

[76] Inventor: Jimmy L. Lee, 2430 Stanwell Dr., Suite 190, Concord, Calif. 94520

[21] Appl. No.: 5,676

[22] Filed: Jan. 22, 1979

[51] Int. Cl.³ .............................................. H01T 19/00
[52] U.S. Cl. .................................... 361/231; 361/235; 363/62
[58] Field of Search ............... 361/231, 235, 229, 263; 307/9, 10 R; 128/190, 419 N; 323/79, 94 R; 363/62, 123, 126, 140, 146; 250/423, 531, 532, 535; 315/111.9; 123/119 E, 148 A, 198 DA

[56] References Cited

U.S. PATENT DOCUMENTS

| | | |
|---|---|---|
| 1,943,426 | 1/1934 | Fischer et al. |
| 3,124,525 | 3/1964 | Remonte. |
| 3,234,432 | 2/1966 | Streib ............................. 361/235 X |
| 3,417,302 | 12/1968 | Lueder ................................ 361/231 |
| 3,541,390 | 11/1970 | Jahnke ............................... 361/231 |
| 3,582,711 | 6/1971 | Jahnke ............................. 361/235 X |
| 3,662,217 | 5/1972 | von Berckheim .................. 361/231 |
| 3,887,846 | 6/1975 | von Berckheim .................. 361/231 |
| 3,936,698 | 2/1976 | Meyer ................................ 361/231 |
| 4,071,004 | 1/1978 | Ostergaard ...................... 123/119 E |
| 4,151,577 | 4/1979 | Yavnieli et al. .................... 361/231 |

FOREIGN PATENT DOCUMENTS

| | | | |
|---|---|---|---|
| 1042720 | 11/1958 | Fed. Rep. of Germany | ........ 323/94 R |
| 2433125 | 1/1976 | Fed. Rep. of Germany | ....... 123/119 E |

*Primary Examiner*—Harry E. Moose, Jr.
*Attorney, Agent, or Firm*—Rankin A. Milliken

[57] ABSTRACT

Automotive air conditioning apparatus for generating air anions in the passenger compartments of motor vehicles is disclosed. The disclosed apparatus includes a voltage converter for converting the ignition voltage of the vehicle engine to a lower voltage suitable for operating an air anion generator located in the passenger compartment of the vehicle. The voltage converter includes a voltage reducer, such as a resistive voltage divider or an autotransformer, a rectifier, a fuse, and a current limiting resistor.

16 Claims, 5 Drawing Figures

AUTOMOTIVE AIR CONDITIONING APPARATUS

BACKGROUND OF THE INVENTION

1. Field of the Invention

The present invention relates to automotive air conditioning apparatus, and more particularly to apparatus for generating air anions in the passenger compartments of motor vehicles.

2. Prior Art Statement (The following prior art statement is submitted pursuant to 37 CFR 1.97 and 1.98. The required patent copies are submitted with this patent application.)

Apparatus for conditioning the air in motor vehicles by electrical treatment has been known for many years.

For example, U.S. Pat. No. 1,943,426, granted to Fischer and Sola on Jan. 16, 1934, discloses the use of a second ignition coil to directly excite an ozone ($O_3$) generator in the passenger compartment of a motor vehicle.

Further, U.S. Pat. Nos. 3,541,390 and 3,887,846 disclose means for conditioning the air in motor vehicle passenger compartments by producing steady electrostatic fields thereacross.

Indeed, the prior art even teaches the electrical conditioning of automative engine intake air, as in U.S. Pat. Nos. 3,124,525 and 4,071,004; although such teachings are clearly irrelevant to the present invention.

The beneficial effects of negative atmospheric or air ions (hereinafter called "air anions") have long been recognized. See, for example, column 1 of U.S. Pat. No. 3,936,698.

The desirability of providing air anions in the passenger compartments of motor vehicles has also long been recognized. See, for example, U.S. Pat. No. 3,662,217.

In view of the extensive body of prior art relating to devices for the electrical conditioning of automotive passenger compartment air, it appears surprising that such devices are not in general use today.

It must be realized, however, that the physiological theories underlying such devices have changed radically from time to time. Thus, the device of the Fischer and Sola ozonator patent cited above, would hardly be likely to be used today, since ozone is now recognized to be physiologically detrimental, rather than beneficial.

In addition, the Fischer and Sola device involves the expense of providing a second ignition coil, and exposes the driver and passengers to the extremely high ignition voltage, at full current, unless the ozonator plates are concealed, e.g., behind the headliner, where its efficiency is necessarily reduced.

Similarly, the electrostatic field devices of Jahnke (U.S. Pat. No. 3,541,390) and Von Berckheim (U.S. Pat. No. 3,887,846) do not directly depend upon well-established physiological effects, and clearly would encounter difficult problems of operation in the high humidity regions of the world.

While devices for providing air anions in motor vehicles passenger compartments, such as the device of U.S. Pat. No. 3,662,217, do operate in accordance with now well-established physiological principles, they have in general required special electronic power supplies, installation during vehicle construction, or extensive retrofitting, all resulting in costs which are not acceptable to the present market of motor vehicle owners.

Prior art air anion generating devices adapted to be plugged into motor vehicle cigar lighter sockets have required special electronic voltage raising circuits, and thus have been so costly as to preclude wide market acceptance.

SUMMARY OF THE INVENTION

It is accordingly an object of the present invention to provide improved automotive air anion generating apparatus.

It is a further object of the present invention to provide automotive air anion generating apparatus which is less costly than prior art devices, and at the same time can be installed without extensive retrofitting or vehicle modification.

Other objects of the present invention will in part be obvious and will in part appear hereinafter.

The present invention, accordingly, comprises the features of construction, combinations of elements, and arrangements of parts, which will be exemplified in the constructions hereinafter set forth, and the scope of the present invention will be indicated in the appended claims.

In accordance with a principal feature of the present invention simple and inexpensive voltage converter means are provided whereby the ignition voltage of a motor vehicle may be converted to a voltage suitable for operating an air anion generator.

In accordance with another principal feature of the present invention, said voltage converting means are so constructed and arranged that the voltage at the output terminal thereof is not harmful when the driver, a passenger, or an automotive mechanic servicing the vehicle accidentally interposes, say, a hand between the output terminal of the voltage converting means and vehicle ground.

In accordance with yet another principal feature of the present invention, voltage converting means for positive-ground vehicular electrical systems, as well as for negative-ground vehicular electrical systems, can be provided in accordance with the teachings of the present invention.

In accordance with an additional feature of the present invention, an automotive air anion generating system of the present invention can be easily and quickly installed in a vehicle, by simply substituting the input lead of the voltage converting means for the high voltage cable interconnecting the ignition coil and the center terminal of the distributor, passing the output lead of the voltage converting means through an existing wire port in the firewall of the vehicle, mounting the air anion generator at a suitable location in the vehicle, and plugging the output lead of the voltage converting means into the thus mounted air anion generator.

For a fuller understanding of the nature and objects of the present invention, reference should be had to the following detailed description, taken in connection with the accompanying drawings.

DESCRIPTION OF THE PREFERRED EMBODIMENTS

Figure 1:
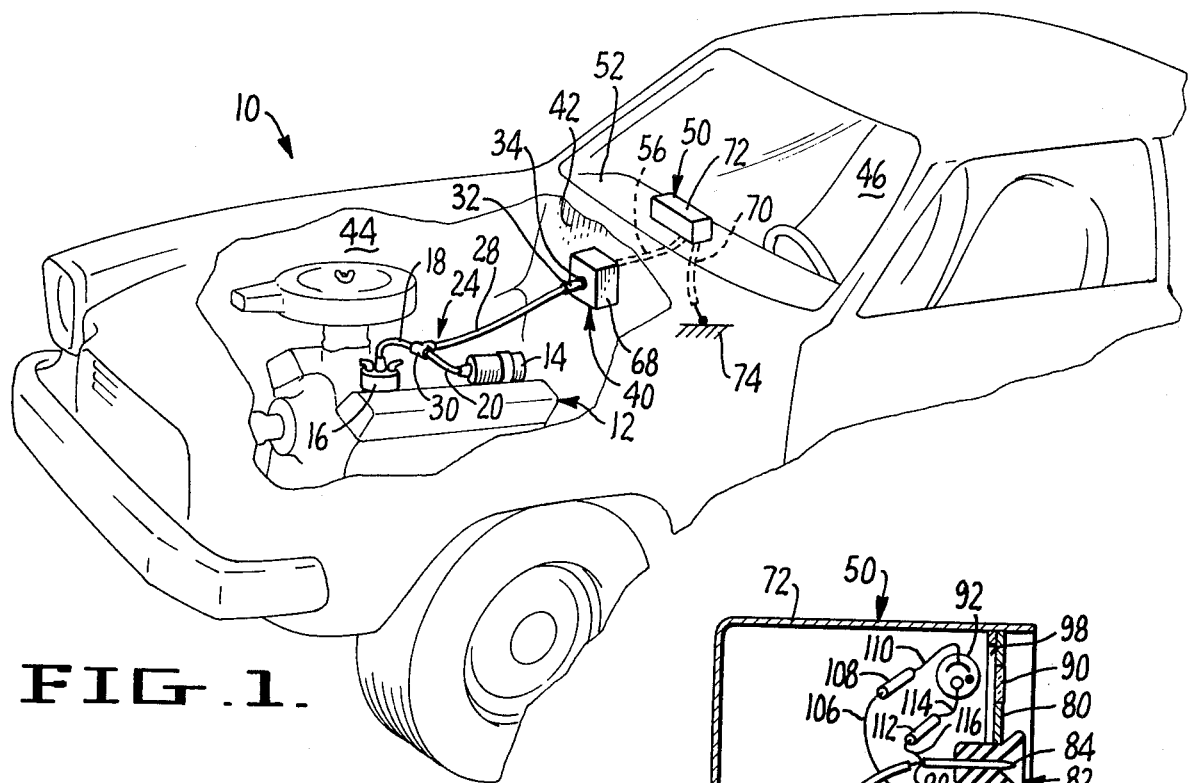
FIG. 1 is a perspective view, partly in section and partly in phantom, of a motor vehicle equipped with an automotive air anion generating system embodying the present invention.

Referring now to FIG. 1, it will be seen that motor vehicle 10 is provided with an engine 12, which itself is provided with an ignition coil 14 and a distributor 16, in the usual manner.

In accordance with a preferred structural feature of the present invention, the conventional high voltage lead extending from ignition coil 14 to the center terminal of the cap of distributor 16 is replaced by two legs or branches 18, 20 of a wye-harness 24.

Wye-harness 24 further comprises a third leg or branch 28, as shown in FIG. 1.

Wye-harness 24 may be thought of as comprising a conventional distributor cable 18, 20, fitted at its opposite ends, in the well-known manner, with conventional plugs for connection to ignition coil 14 and distributor 16, respectively. This conventional distributor cable may be stripped of its conventional insulation at junction 30, and one end of the wire of leg 28 directly electrically connected thereto. In accordance with the principals of the present invention, the wire of leg or branch 28 is provided with suitable high voltage insulation, generally similar to that employed to insulate the conventional distributor lead 18, 20, and conventional insulating means is provided at junction 30 to insulate junction 30, joining the insulation of legs 18, 20, and 28 to form an essentially integral insulation.

The wire of leg 28 need not be comprised of the high resistance material of the wire of conventional distributor lead 18, 20, but rather may be fabricated from a plurality of individual copper wires, braided or otherwise, in the usual manner.

Figure 2:
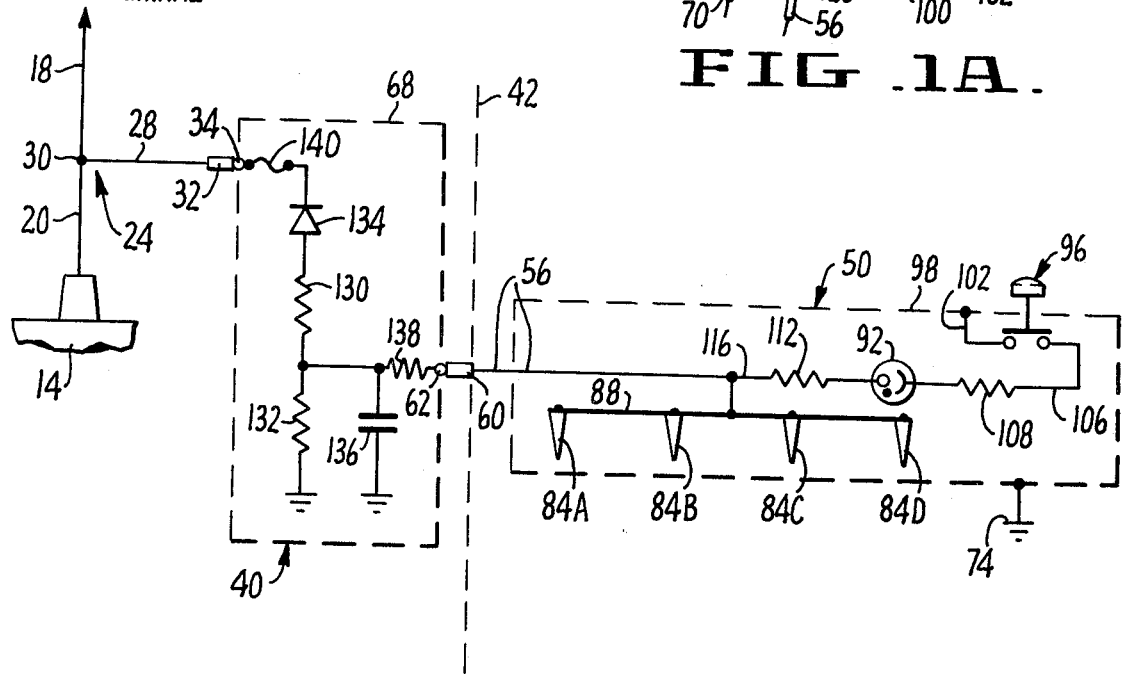
FIG. 2 is a schematic representation of the circuit of an automotive air anion generating system embodying the present invention, adapted for use in motor vehicles having negative-ground electrical systems.

Referring again to FIG. 1, it will be seen that leg 28 of wye-harness 24 is provided at its end remote from junction 30 with a suitable plug-in connector 32, which is adapted to be plugged into a terminal 34 of a voltage converter 40 which embodies teachings of the present invention, thereby directly electrically connecting the wire of leg 28 of wye-harness 24 to the high voltage terminal 34 of the circuit of voltage converter 40 (see, for example FIG. 2).

As further seen in FIG. 1, voltage converter 40 may conveniently be mounted on the partition 42 of motor vehicle 10 which separates the engine compartment 44 thereof from the passenger compartment 46 thereof, which partition is sometimes called the "firewall".

It is to be understood, however, that the present invention is in no sense limited to devices in which the voltage converter is mounted on the firewall of the motor vehicle, nor to devices in which the interconnection between leg 28 and voltage converter 40 is a demountable connection, i.e., provided by means of a plug and associated jack, nor to devices in which the existing high voltage distributor lead is replaced by a wye-harness such as wye-harness 24.

Referring again to FIG. 1, it will be seen that the automotive air anion generating system of the invention further comprises an air anion generator 50, which, for purposes of illustration only, is mounted on the top of the dashboard 52 of motor veicle 10.

As further seen in FIG. 1, voltage converter 40 is interconnected with air anion generator 50 by means of a wire or cable 56. Cable 56 may, for example, be an insulated copper wire, or group of copper wires, provided at its end remote from generator 50 with a suitable plug 60 (FIG. 2) adapted to directly electrically connect one end of wire 56 to the output terminal 62 (FIG. 2) of voltage converter 40.

It is to be understood that plug 60 is preferably of the very slim type, no thicker than the outer diameter of the insulation of wire 56, so that it can be readily thrust through an existing wire port in firewall 42 of motor vehicle 10.

The input and output terminals 34, 62 of voltage converter 40 will preferably be jacks securely mounted in the housing 68 of voltage converter 40, each jack 34, 62 being suitable for co-action with its respective associated plug 32, 60. It is to be particularly understood, however, that jacks 34 and 62 (FIG. 2) are electrically insulated from each other, and are not electrically connected through the housing 68 of voltage converter 40. In other words, the wire of leg 28, which may also be thought of as the input or supply lead of voltage converter 40, is insulated from the wire of interconnecting lead 56, which interconnects voltage converter 40 and air anion generator 50.

As yet further seen in FIG. 1, air anion generator 50 is provided with a grounding wire or lead 70, which insulatedly extends through the housing 72 of generator 50, and is directly electrically connected to a suitable vehicle ground point 74, which may conveniently be located within dashboard 52.

Figure 1A:
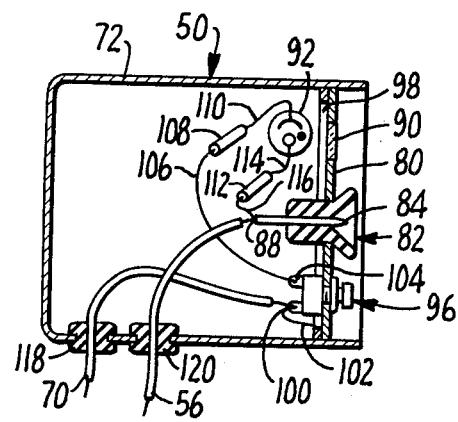
FIG. 1A is a vertical sectional view of an air anion generator of the kind used in carrying out the present invention.

Referring now to FIG. 1A, it will be seen that the housing 72 of air anion generator 50 is closed on its side facing the interior of motor vehicle 10 by a panel 80. While both housing 72 and panel 80 are indicated in FIG. 1A as being composed of conductive material, they may also be composed of insulating material.

Mounted in panel 80 is an insulator or electrode carrier 82. Electrode carrier 82 is formed from high voltage insulating material, and is generally axially symmetrical about a needle electrode 84, which is fastened, as by cementing, in a close-fitting central bore of electrode carrier 82. Generally, electrode carrier 82 comprises two integral portions, viz., a generally conical portion (shown immediately to the right of panel 80 in FIG. 1A), and a generally cylindrical portion (shown largely to the left of panel 80 in FIG. 1A). Both the cylindrical portion and the conical portion of electrode carrier 82 are substantially axially symmetrical about the axis of needle electrode 84.

Needle 84 may, for example, be an old style steel phonograph needle, having a sharp point within the "bowl" formed by the conical portion of electrode carrier 82. Electrode carriers and needle electrodes like electrode carrier 82 and needle electrode 84 are well-known in the air anion generating art, and form no part of the present invention.

It is to be understood that in the first preferred embodiment of the present invention as shown and described herein four needle electrodes, supported by four separate electrode carriers, are mounted in panel 80, in side-by-side linear array. These four needle electrodes are schematically represented in FIG. 2 as needle electrodes 84A through 84D, it being understood that though not shown each of these needle electrodes 84A through 84D is supported by a respective associated insulating electrode carrier 82A through 82D.

As may be seen by comparison of FIG. 1A and FIG. 2, the inner ends of needle electrodes 84A through 84D, lying to the left of panel 80 in FIG. 1A, are directly electrically connected by means of a conductive wire or buss 88.

As also seen in the same figures of the drawings, common wire or buss 88 is directly electrically connected to interconnecting wire or lead 56.

Also mounted in panel 80 is a lens or filter 90, by means of which a neon indicator lamp 92 contained within housing 72 may be viewed from the driver's position of motor vehicle 10.

Also mounted on panel 80, and passing therethrough, is a normally-open, push-to-close pushbutton test switch 96, the function and interconnections of which will be disclosed hereinafter.

Located immediately behind panel 80 (to the left thereof in FIG. 1A), and extending substantially completely around the periphery of panel 80, is a conductive ground ring electrode 98. As will be evident to those having ordinary skill in the art, informed by the present disclosure, ground ring electrode 98 is not unique to the present invention, and may be dispensed with in certain other embodiments of the present invention.

In the first embodiment of the present invention, viz., the embodiment of FIGS. 1, 1A, and 2, ground ring electrode 98 is directly electrically connected to the lower electrode 100 of pushbutton test switch 96 (FIG. 1A) by means of a grounding wire 102. Terminal 100 of test switch 96 is directly electrically connected to ground wire 70, and thus both ground ring electrode 98 and terminal 100 of test switch 96 are directly electrically connected to vehicle ground 74 (FIG. 1).

As further seen in FIG. 1A, the upper terminal 104 of test switch 96 is connected via a wire 106 to one terminal of a resistor 108. The other terminal of resistor 108 is connected to the cathode of indicator lamp 92 by means of a wire 110.

Similarly, the respective terminals of a resistor 112 are connected between the anode of neon indicator lamp 92 and common buss 88 by means of wires 114 and 116.

Grommets 118 and 120 are provided to protect wires 56 and 70 against chafing, in the usual manner.

Referring now to FIG. 2, in which parts corresponding to those shown in FIGS. 1 and 1A are indicated by the same reference numerals, there is shown a complete schematic circuit diagram of the air anion generating system of the first preferred embodiment of the present invention.

It is to be particularly noted that in the representation of air anion generator 50 shown in the right-hand portion of FIG. 2 ground ring electrode 98 is represented by a dashed rectangle. It is to be understood that this dashed rectangle does not represent housing 72 or panel 80. Further, it should be noted that wire 56 is not directly electrically connected to ground ring electrode 98, but rather is only connected thereto through resistor 112, neon indicator lamp 92, resistor 108, and test switch 96, and then only when test switch 96 is closed.

As further shown in FIG. 2, the circuit of the voltage converter 40 of the first preferred embodiment comprises a pair of resistors 130, 132, a rectifying diode 134, a capacitor 136, a third resistor 138, and a fuse 140, all interconnected as indicated in FIG. 2.

In the first preferred embodiment, as shown in FIG. 2, diode 134 is a high voltage silicon diode, having a peak inverse voltage of 10 kilovolts and a maximum current of 1 milliampere, such as can be obtained from the International Rectifier Corporation. Resistors 130 and 132 are 30 megohm, high voltage, spiral carbon film resistors, rated at 50 kilovolt breakdown voltage and $\frac{1}{2}$ to $\frac{1}{4}$ watt permissible dissipation. Capacitor 136 is a high voltage (10 kilovolt) ceramic capacitor of 0.1 to 1.0 microfarads capacity, such as are made by the Sprague Electric Corporation. Resistor 138 is a high voltage 10 megohm resistor, to a tolerance of ±20%, rated at $\frac{1}{4}$ watt to $\frac{1}{2}$ watt permissible dissipation. Fuse 140 is rated to blow at approximately 250 microamperes, and thus may be fabricated, e.g., from light wire of about 44 A.W.G.

Referring now to the schematic showing of air anion generator 50 in FIG. 2, neon indicator lamp 92 may be a 115 volt neon lamp, e.g., an NE51 neon lamp. Resistor 108 is a 100 kilohm, 100 watt, 10% tolerance resistor. As will be understood by those having ordinary skill in the art, a resistor having a value of the order of 100 kilohms is sometimes found to be incorporated in certain neon indicator lamps, in which event resistor 108 should be dispensed with, and the terminal of neon lamp 92 to which that internal resistor is tied should be directly connected to terminal 104 of test switch 96, or connected to the end of wire 106 remote from terminal 104. Resistor 112 is a 1 megohm carbon composition or carbon film resistor, but need not necessarily be a high voltage resistor.

As will now be evident to those having ordinary skill in the art, certain substitutions, changes in value, wattage, etc., from the precise circuit arrangement shown in FIG. 2 can be made by those having ordinary skill in the art without the exercise of invention, and it is to be understood that all such variations fall within the scope of the present invention.

It will also be realized by those having ordinary skill in the art, informed by the present disclosure, that the present invention provides very great advantages by way of safety over devices such as the ozonator of the Fischer and Sola patent, in that the device of the present invention provides protection for the passenger, driver, or mechanic who inadvertently bridges his hand, or some other part of his body, between needle electrode 84 and vehicle ground.

To achieve this safety factor, it has been determined that the value of ionization current limiting resistor 138 is of great importance.

Given the value of resistor 138, and the values of the other components of the circuit of FIG. 2, set out hereinabove, the following operation takes place when, e.g., the driver's hand inadvertently becomes bridged between needle electrode 84 and some vehicle ground point. Resistor 138 (10 megohms) takes nearly all the voltage across capacitor 136, excepting only about 5 volts, and, since the contact resistance of the human body is of the order of 300 kilohms, the driver does not sustain a fatal, or even injurious shock. In fact, observers thus bridging needle electrode 84 to ground with their hands have observed that the only perceptible sensation is that of the "ion wind", and that this same "ion wind" is perceived even before the hand contacts needle electrode 84. For best realization of this safety factor in air anion generating systems embodying the present invention, the value of resistor 138 should be no less than 5 megohms.

On the other hand, in experimentally reducing the present invention to practice, it has been determined that the ohmic value of resistor 138 should not considerably exceed 10 megohms.

As noted hereinabove, the production of ozone in the passenger compartment of an automobile or truck, while considered beneficial at the date of the Fischer and Sola patent, is now known to be affirmatively harmful. Thus, it is desired to minimize or elimate, as much as possible, the production of ozone in automotive air anion generating devices and systems.

By employing the circuit component values set out hereinabove in connection with FIG. 2, and particularly the value of resistor 138 as just discussed, i.e., no less than 5 megohms and very little more than 10 megohms, the resulting voltage between needle electrodes 84A through 84D and ground is made to fall in the approximate range of 4500 volts to 5000 volts.

At this needle voltage the "ion size", i.e., the number of unit excess charges on the majority of ions produced, is neither too large nor too small, but rather approaches the known physiological optimum.

Thus, the first preferred embodiment of the invention acheives a highly desirable combination of shock hazard safety on the one hand and optimum air anion production on the other hand, while minimizing or completely eliminating ozone production.

This highly desirable combination of desiderata is not achieved by the device of the Fischer and Sola patent, or any of the prior art adduced in the above prior art statement.

It is further to be observed that because of the particular properties of the automotive air anion generating circuit of the present invention it is possible to incorporate a simple fuse arrangement 140 whereby the engine of the equipped motor vehicle will not be disabled if a component of the automotive air anion generating system of the invention fails.

Figure 3:
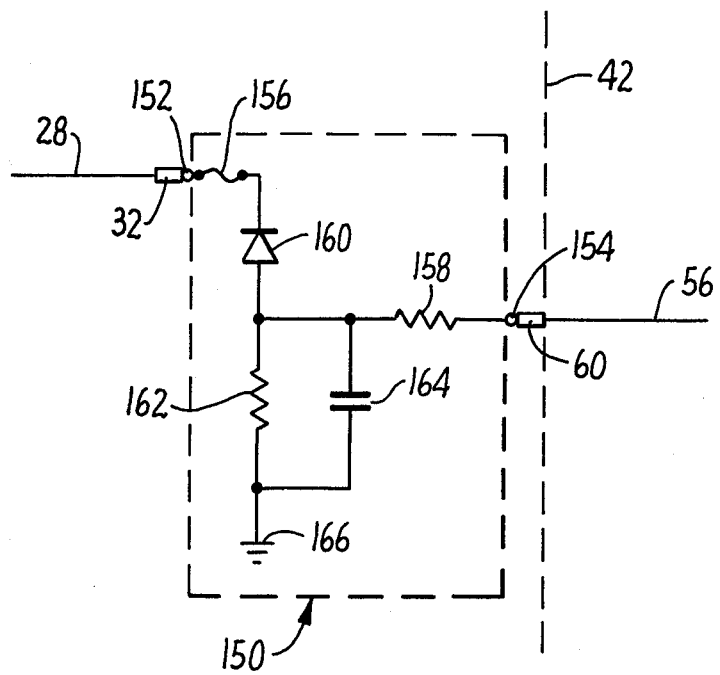
FIG. 3 is a schematic representation of a voltage converter circuit embodying the teachings of the present invention, which is alternative to the voltage converter circuit of the embodiment of FIG. 2.

Referring now to FIG. 3, there is shown a voltage converter 150 which may, within the scope of the present invention, be substituted for voltage converter 40 in the automotive air anion generating system of the first preferred embodiment of the present invention (FIG. 2).

For purposes of identification, it is to be understood that the second preferred embodiment of the present invention, as described hereinbelow, comprises the system shown in FIG. 2 with voltage converter 150 of FIG. 3 substituted for voltage converter 40 of FIG. 2.

The second preferred embodiment of the present invention, like the first preferred embodiment of the present invention, is adapted for use in motor vehicles having negative-ground electrical systems.

The manner of substituting voltage converter 150 for voltage converter 40 in the embodiment of FIG. 2 will now be apparent to those having ordinary skill in the art, informed by the present disclosure. Thus, in substituting voltage converter 150 for voltage converter 40 one need only dismount voltage converter 40 from firewall 42 (FIG. 1); withdraw plug 32 from jack 34 of voltage converter 40; withdraw plug 60 from jack 62 of voltage converter 40; insert plug 32 into jack 152 of voltage converter 150 (FIG. 3); insert plug 60 into jack 154 of voltage converter 150 (FIG. 3); and mount voltage converter 150 on firewall 42 of motor vehicle 10 (FIG. 1).

Readverting to FIG. 3, it should first be realized that dashed rectangle 150, like dashed rectangle 40 in FIG. 2, merely represents the voltage converter housing, and should not be though of as interconnecting jacks 152 and 154, which, like jacks 34 and 62, are mutually electrically insulated.

Jack 152, like jacks 34, 62, and 154, may be a one-spring open-circuit jack, e.g., of the type sometimes known as a "telephone jack", wherein only the spring or center contact is used as a circuit connecting element. Thus, as will now be understood from FIG. 3 by those having ordinary skill in the art, plug 32 and jack 152 of voltage converter 150 serve to provide a direct electrical connection between wire 28 and the left hand terminal of fuse 156 (as seen in FIG. 3).

Similarly, plug 60 and jack 154 serve to provide direct electrical connection between wire 56 and the right hand terminal (as seen in FIG. 3) of a resistor 158.

As further seen in FIG. 3, a rectifying diode 160 is directly electrically connected between the right hand terminal of fuse 156 and the left hand terminal of resistor 158. Further, it will be seen in FIG. 3 that the parallel combination of resistor 162 and capacitor 164 is connected between the anode of rectifying diode 160 and ground point 166. (Ground point 166, like all of the ground points indicated herein by the same symbol, is to be understood to be a vehicle ground, i.e., a direct electrical connection to the frame or other electrically associated metallic portion of motor vehicle 10.

As will now be understood, all of the parts of FIG. 3 which are also found in FIG. 2 are indicated by the same reference numerals in both figures.

In the circuit of voltage converter 150 fuse 156 may be substantially identical to fuse 140 of voltage converter 40. Fuse 158 may be substantially identical to fuse 138 of voltage converter 40, i.e., may be a high voltage, $\frac{1}{2}$ watt to $\frac{1}{4}$ watt ±20% tolerance resistor having a ohmic value lying between 5 megohms and slightly more than 10 megohms. It will be understood, then, that resistor 158, like resistor 138, is an ionization current limiting resistor, and that the remarks found hereinabove relatin to the selection, etc., of resistor 138 apply as well to resistor 158. It is to be understood in connection with resistor 158, as with resistor 138 above, that while the scope of ohmic values set out hereinabove is such as to produce optimum embodiments of the present invention, the scope of the present invention is not limited to the employment of such ionization current limiting resistor values, since some of the abovesaid combination of desiderata may be sacrificed to commercial expediency or a desire to evade the scope of the present invention without in fact exceeding the scope of the present invention.

Returning to FIG. 3, and the values of the components of the circuit thereof, diode 160 may be substantially identical to diode 134 of voltage converter 40.

In the circuit of voltage converter 150, resistor 162 may be a 60 megohm, $\frac{1}{4}$ to $\frac{1}{2}$ watt, spiral carbon film resistor; and capacitor 164 may be substantially identical to capacitor 136 of voltage converter 40 (FIG. 2).

Figure 4:
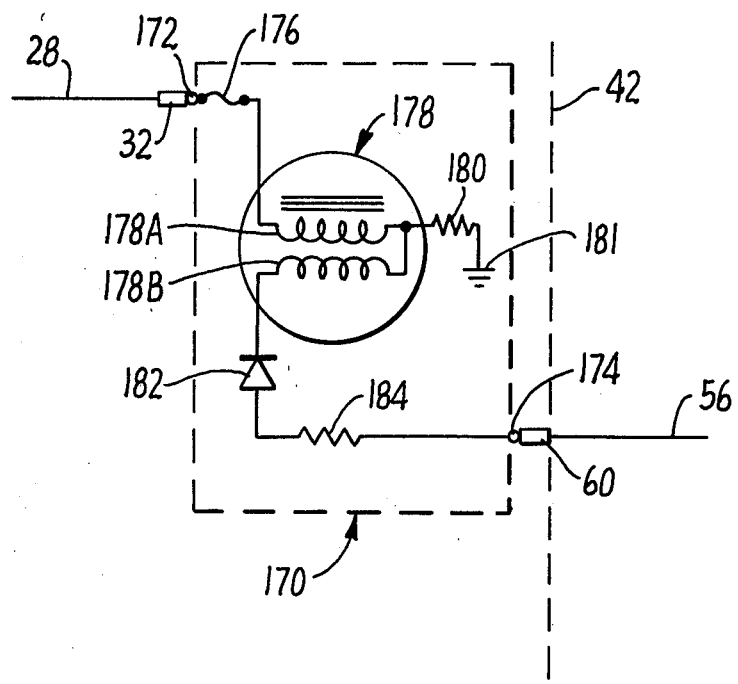
FIG. 4 is a schematic representation of the circuit of a voltage converter suitable for use in place of the voltage converter of the system of FIG. 2, where the automotive air anion generating system of the invention is to be employed in a motor vehicle having a positive-ground electrical system.

Referring now to FIG. 4, there is shown an alternative voltage converter 170, which may be substituted for voltage converter 40 in the system of the first preferred embodiment of the present invention when motor vehicle 10 has a positive-ground electrical system or positive vehicle polarity. (See *Auto Engine Tune-Up* by Richard S. Roeing, Theodore Audel and Company, Indianapolis, Ind., 1975, pages 151 through 153.)

As will now be understood, in the event that motor vehicle 10 is a positive polarity vehicle, i.e., has a positive ground battery connection, the voltage converter 170 of FIG. 4 should be mounted on firewall 42, in the illustrated position of voltage converter 40 in FIG. 1, plug 32 of line 28 inserted into jack 172, and plug 60 of line 56 inserted into jack 174; immediately whereafter the automotive air anion generating system of the third preferred embodiment of the present invention, thus installed in said positive polarity vehicle, is ready for operation.

Referring now to FIG. 4, and comparing the same with FIG. 2, it will be understood that the left hand terminal of the fuse 176 is directly electrically connected to the central or spring contact of jack 172. Jacks 172 and 174 may be substantially identical to the corresponding jacks 152 and 154 of voltage converter 150, and shown in FIG. 3.

Fuse 176 (FIG. 4) may be substantially identical to the abovedescribed fuses 140 and 156.

The autotransformer 178 of FIG. 4 may be a high voltage photoflash trigger transformer of the kind manufactured by the Sentinel Manufacturing Company, and available from Mouser Electronics of Lakeside, Calif., under stock numbers 42FM401; 42FM403; 42FM602. More generally, transformer 178 is an iron cored step-down transformer, having a turns ratio of approximately two-to-one. Resistor 180 may be dispensed with, i.e., replaced with a substantially zero impedance connection, if both windings of transformer 178 are so constructed and arranged as to have relatively high impedance. In any event, primary winding 178A will have approximately twice as many turns as secondary winding 178B.

As further seen in FIG. 4, the left hand terminal of primary winding 178 A is directly electrically connected to the right hand terminal of fuse 176; and the left hand terminal of secondary winding 178B is directly electrically connected to the cathode of rectifying diode 182.

Resistor 180, which is directly electrically connected between the common junction point of windings 178A and 178B and vehicle ground 181, may be a high voltage 25 megohm resistor (50 kilovolt breakdown potential) rated at ¼ watt to ½ watt, and of spiral carbon film construction.

Rectifying diode 182 may be substantially identical to rectifying diode 134 of voltage converter 40 of FIG. 2.

Also seen in FIG. 4 is a resistor 184 which is directly connected between the anode of rectifying diode 182 and the central spring contact of jack 174. Resistor 184 may be of the same type, and fall in the same ohmic value range, as the above-described resistors 158 and 138. The remarks found hereinabove concerning resistors 138 and 158 apply equally to resistor 184.

TERMINOLOGY

The terms "voltage reducing circuit" and "voltage reducing circuit means" are used herein in their broadest acceptation to denote voltage dividers such as the voltage divider 134, 130, 132 of FIG. 2, and the voltage divider 160, 162 of FIG. 3, and also autotransformer 178 of FIG. 4, and their functional equivalents.

The term "current limiting means" is used herein in its broadest acceptation to denote fuses such as fuses 140, 156, and 176, and all of the functional equivalents thereof, including but not limited to fuses of other construction and capacity, and thermal or electromechanical circuit breaking means.

The term "rectifying means" is used herein in its broadest acceptation to denote diodes such as diode 134, 160, and 182, and all of their functional equivalents.

The term "voltage wave integrating means" is used herein in its broadest acceptation to denote any subcircuit capable of integrating an input voltage wave, e.g., a low-pass filter of long time constant such as the combination of capacitor 136 and resistor 132 in FIG. 2, or the combination of autotransformer 178 and resistor 180 in FIG. 4, and all of their functional equivalents.

The term "branch" is used herein in its common acceptation to denote, e.g., the series-connected combination of resistor 130, diode 134, and fuse 140 in FIG. 2.

The term "integrating capacitor" is used herein in its broadest acceptation to indicate any capacitor, such as capacitor 136 of FIG. 2, which functions with an associated resistance element to integrate an applied voltage wave.

The term "passenger" is used herein in its broadest acceptation to denote not only those riding in a motor vehicle and not operating the vehicle, but also the driver of a motor vehicle.

The terms "vehicle" and "motor vehicle" as used herein are used in their broadest acceptation to denote not only passenger automobiles, but also trucks, busses, and the like.

It will thus be seen that the objects set forth above, among those made apparent from the preceding description, are efficiently attained, and since certain changes may be made in the above constructions without departing from the scope of the present invention, it is intended that all matter contained in the above description or shown in the accompanying drawings shall be interpreted as illustrative only, and not in a limiting sense.

It is also to be understood that the following claims are intended to cover all of the generic and specific features of the invention hereindescribed, and all statements of the scope of the invention which, as a matter of language, might be said to fall therebetween.

What is claimed is:

1. A voltage converter for converting the ignition voltage of the engine of an automobile to a lower voltage suitable for operating an air anion generator located in the passenger compartment of said automobile, comprising:

voltage reducing circuit means having a high voltage terminal, electrical connecting means adapted to be connected to the circuit providing said ignition voltage to connect the same to said high voltage terminal, and a low voltage terminal; and current limiting means having a first terminal, a second terminal, and electrical connecting means adapted to interconnect said second terminal and said air anion generator;

said first terminal of said current limiting means being connected to said low voltage terminal of said voltage reducing circuit means.

2. A voltage converter as claimed in claim 1 in which said voltage reducing circuit means comprises rectifying means.

3. A voltage converter as claimed in claim 2, further comprising voltage wave integrating means connected to said low voltage terminal of said voltage reducing circuit means.

4. A voltage converter as claimed in claim 3, further comprising overcurrent circuit breaking means for opening a branch of said voltage reducing circuit means when the current therethrough exceeds a predetermined maximum value.

5. In a motor vehicle having an engine including a source of ignition voltage, the improvement comprising:

voltage converter means for converting said ignition voltage to a lower voltage suitable for operating an air anion generator;

ignition voltage connection means adapted to connect said voltage converter means to said source of ignition voltage;

air anion generating means located in the passenger compartment of said motor vehicle; and ionizer voltage connection means adapted to interconnect said air anion generating means with said voltage converter means.

6. The combination claimed in claim 5, in which said voltage converter means comprises:

voltage reducing circuit means having a high voltage terminal and a low voltage terminal; and current limiting means having a first terminal and a second terminal;

said first terminal of said current limiting means being connected to said low voltage terminal of said voltage reducing circuit means.

7. The combination claimed in claim 6 in which said voltage reducing circuit means comprises rectifying means.

8. The combination claimed in claim 6, further comprising voltage wave integrating means connected to said low voltage terminal of said voltage reducing circuit means.

9. The combination claimed in claim 6 in which said voltage reducing circuit means comprises rectifying means and overcurrent circuit breaking means for opening a branch of said voltage reducing circuit means when the current therethrough exceeds a predetermined maximum value.

10. The combination claimed in claim 6 in which said voltage reducing circuit means comprises first and second inductively coupled winding means.

11. The combination claimed in claim 5 in which said voltage converter means comprises:

input terminal means;

output terminal means;

voltage reducing circuit means having high voltage terminal means connected to said input terminal means and low voltage terminal means;

voltage wave integrating means connected to said low voltage terminal means; and current limiting means connected between said low voltage terminal means and said output terminal means.

12. The combination claimed in claim 11 in which said voltage reducing circuit means comprises rectifying means.

13. The combination claimed in claim 12 in which said voltage reducing circuit means further comprises overcurrent circuit breaking means for opening a branch of said voltage reducing circuit means when the current therethrough exceeds a predetermined maximum value.

14. The combination claimed in claim 11 in which said voltage reducing circuit means comprises first and second inductively coupled winding means.

15. The combination claimed in claim 14 in which said voltage reducing circuit means further comprises rectifying means.

16. The combination claimed in claim 15 in which said voltage reducing circuit means further comprises overcurrent circuit breaking means for opening a branch thereof when the current therethrough exceeds a predetermined maximum value.

* * * * *